F. O. BALL.
MEASURING DEVICE.
APPLICATION FILED JAN. 8, 1917.

1,281,242.   Patented Oct. 8, 1918.

Inventor
Frederick O. Ball
Attorney

UNITED STATES PATENT OFFICE.

FREDERICK O. BALL, OF DETROIT, MICHIGAN, ASSIGNOR TO BALL & BALL CARBURETOR COMPANY, OF DETROIT, MICHIGAN, A CORPORATION OF MICHIGAN.

MEASURING DEVICE.

1,281,242.            Specification of Letters Patent.        Patented Oct. 8, 1918.

Application filed January 8, 1917. Serial No. 141,233.

*To all whom it may concern:*

Be it known that I, FREDERICK O. BALL, a citizen of the United States, residing at Detroit, in the county of Wayne and State of Michigan, have invented new and useful Improvements in Measuring Devices, of which the following is a specification.

This invention relates to measuring devices and consists in certain improvements in the construction thereof as will be hereinafter fully described and pointed out in the claims.

The measuring device is particularly designed for measuring gasolene in testing automobiles. Heretofore it has been common to ascertain the gasolene consumption by measuring the gasolene consumed in some ordinary measuring vessel. This is accompanied by a great deal of inconvenience and makes such testing, especially if it is carried through any extended range very tedious and in some respects unsatisfactory. The present invention has particularly in view a measuring device in which these objections are obviated.

The invention is illustrated in the accompanying drawings as follows:—

Figure 1:
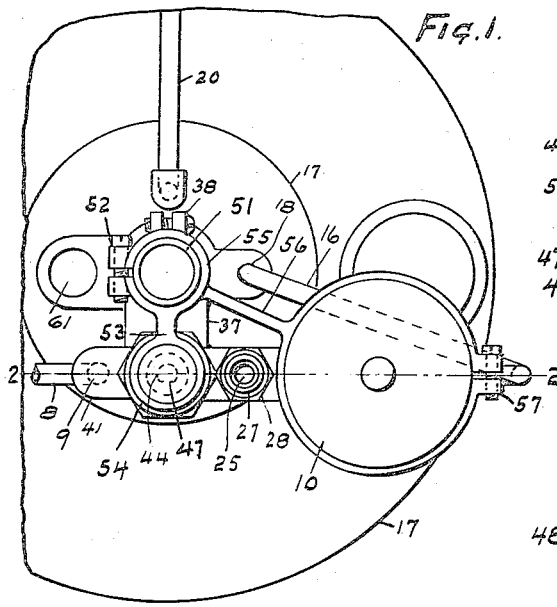

Figure 1 is a plan view of the device.

Figure 2:
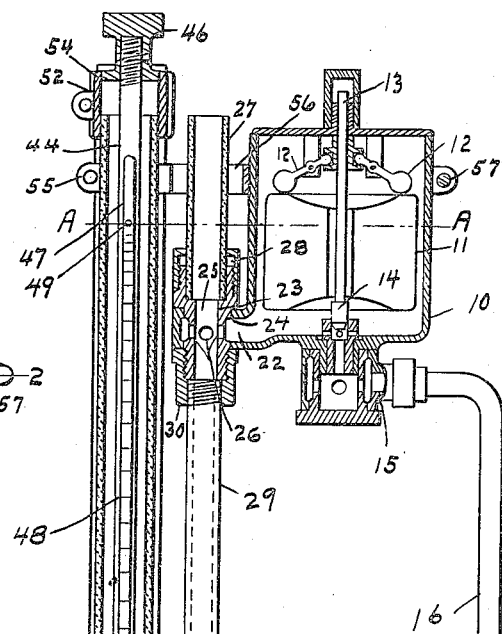
Figure 2:
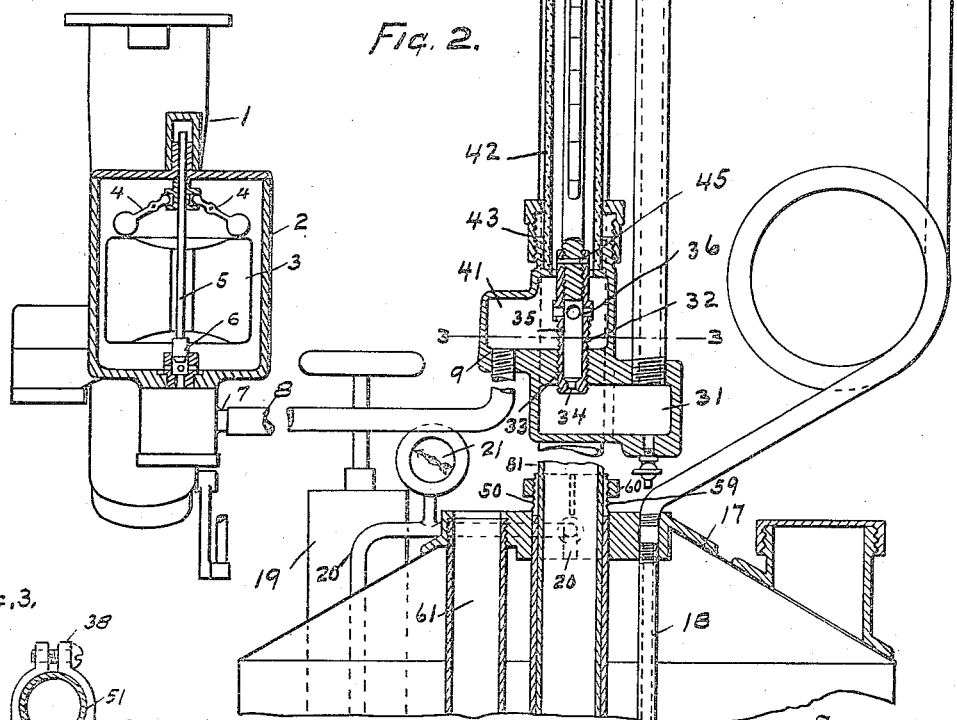

Fig. 2 a vertical section of the device on the line 2—2 in Fig. 1.

Figure 3:
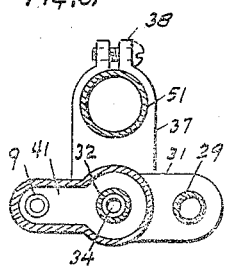

Fig. 3 a section on the line 3—3 in Fig. 2.

1 marks in outline the carbureter, 2 a float chamber, 3 a float, 4 levers operated by the float, 5 a valve stem, 6 the inlet valve to the carbureter, 7 the inlet passage and 8 a connection between the carbureter and the measuring device. The connection 8 is ordinarily in the form of a flexible tube so that the measuring device may be conveniently placed and the fuel carried from it to the carbureter, the tube extending to the discharge 9 of the measuring device.

The measuring device has a means for supplying fuel to it from a constant level. As shown this is accomplished by the float chamber 10. The float 11 in the chamber operates the levers 12. The levers 12 operate the valve stem 13 and the valve 14 carried by the stem 13 controls the inflow to the float chamber. This operates in the ordinary manner of float chambers of this type. The inlet opening of the float chamber 15 is connected by a pipe 16 with a supply tank 17, a pipe 18 extending downwardly into the supply tank so that the discharge from the supply tank may be carried to a point where the said tank is nearly empty.

The supply tank 17 is inclosed and the fuel therein is put under pressure by means of an air pump 19, the discharge of the air pump being connected through a pipe 20 with the supply tank. By means of this pump a sufficient head may be put on the liquid in the supply tank through the air pressure to elevate the fuel through the pipe 16 to the float chamber 10. A pressure gage 21 may be supplied so that the pressure may be observed and the operator assured of sufficient pressure to elevate the liquid to the float chamber 10.

A discharge projection 22 extends from the float chamber. A fitting 23 extends through an opening 24 in this projection. The fitting has an axial opening 25 and radial openings 26 connect this axial opening with the discharge from the float chamber. An observation tube 27 of glass, or similar material, is mounted in the upper end of the fitting 23, a stuffing box 28 being provided for the lower end of the tube 27. A pipe 29 is connected by a union 30 at the lower end of the fitting 23 and connects the passage 25 in the fitting with a chamber 31. The pipe 29 is sufficiently long so as to place the chamber 31 far enough below the level in the float chamber to give a reading scale of the range desired.

A metering fixture 32 is screwed into the discharge opening 33 from the chamber 31. This extends upwardly from the chamber. The lower end of the fitting 32 has a metering restriction 34 which forms a means of communication between the chamber 31 and the central passage 35 in the fixture 32. Radial openings 36 extend outwardly from the fitting 35 into a discharge chamber 41 from which the discharge 9 leads. A counterhead receptacle is arranged above the chamber 41. This is preferably formed by means of a glass tube 42 which is arranged in a stuffing box 43 at the top of the chamber 41. The tube 42 is concentric with the fitting 32. This tube 42 extends upwardly to above the level A—A established by the float chamber and is in communication with the chamber 41. The operation of this measuring device is as follows: When fuel is drawn into the float chamber 2 of the carbureter in the running of the automombile, this flow of gasolene immediately starts the flow of gasolene from the counter-head receptacle 42 and also through the restricted metering opening 34. The level in the counter-head receptacle 42 gradually falls and this continues until the difference in the levels of liquid in the counter-head receptacle 42 and the level in the float chamber 10 is such as to create a sufficient head at the restricted opening 34 to supply the volume of liquid which is being discharged to the carbureter. If this flow remains constant the level of the liquid in the counter-head 42 will remain constant but if this flow changes immediately the level in the tube 42 will rise or fall so as to create a difference in level of liquid in it from that of the float chamber 10 to produce the head necessary to force the volume of liquid discharged through the restricted opening 34.

It follows, therefore, that a given flow of liquid will be accompanied by a given level of liquid in the tube 42 and it is only necessary to supply a scale for the tube 42 which will indicate the flow at each level. In the present structure a rod 44 is screwed into the fitting 32 and locked therein by a pin 45. The rod 44 terminates in a button 46 so that it may be utilized for removing and inserting the fitting 32. By this means fittings having openings 34 of different sizes may be introduced so as to vary the capacity of the measuring device. One side of the rod 44 is flattened as at 47 and a scale 48 is arranged on this flattened portion having zero at 49. The screw-threaded connection of the fitting 32 in the opening 33 may be utilized for adjusting the rod vertically so as to bring zero to the level A—A established by the float chamber.

In the use of this device in testing with automobiles it is desirable to have the apparatus so that a supply tank may be placed in the automobile with it and the liquid supplied to the measuring device from this tank. I utilize this tank as a base on which the device is mounted. A pipe 50 is secured in the tank 17. A second pipe 51 extends telescopically into the pipe 50 and has sufficient length to bring the scale 48 to a sufficient elevation to be conveniently read. A clamp 52 is secured to the upper end of the pipe 51. It has an extension 53 with a loop or ring 54 which extends over the upper end of the glass tube 42. This forms a guide for the tube and also for the button 46 and with it the rod 44. A second clamp 55 is secured to the pipe 51. It has an extension 56 with a clamp 57 which extends around the float chamber 10 and thus supports the upper end of the mechanisms connected with the float chamber. The chamber 31 has an extension 37 which has a clamp 38 secured on the pipe 51. The upper end of the pipe 50 is screw-threaded at 59 with a tapered screw and is slotted as shown in dotted lines. A nut 60 operates on this tapered screw thread and thus forms a clamp by means of which the pipe 51 may be secured at any desired elevation in the pipe 50. The tube 16 is ordinarily formed of rubber and is of sufficient length to permit of the vertical adjustment of the device as may be desired. A mercury well 61 is provided in the tank by means of which the temperature of the liquid may be taken if desired, this being sometimes a necessary feature of the test. This mercury well is simply a well open to the atmosphere in which mercury is placed. The temperature of the gasolene is communicated to this mercury and the temperature of the gasolene can thus be readily determined by the insertion of a thermometer bulb into the mercury well.

What I claim as new is:—

1. In a measuring device, the combination of means for supplying fluid with a constant head; a counter-head receptacle; a scale for indicating the level of the counter-head in the counter-head receptacle; and connections between the means and counter-head receptacle comprising a removable fitting having a metering restriction.

2. In a measuring device, the combination of means for supplying fluid with a constant head; a counter-head receptacle; a scale for indicating the level of the counter-head in the counter-head receptacle; connections between the means and counter-head receptacle comprising a removable fitting having a metering restriction, said fitting being arranged at the bottom of the receptacle; and a rod extending through the receptacle and secured to the fitting for removing the same.

3. In a measuring device, the combination of means for supplying fluid with a constant head; a counter-head receptacle; a scale for indicating the level of the counter-head in the counter-head receptacle; connections between the means and counter-head receptacle comprising a removable fitting having a metering restriction, said fitting being arranged at the bottom of the receptacle; and a rod extending through the receptacle and secured to the fitting, said rod having a scale thereon for indicating the counter-head and rate of discharge.

4. In a measuring device, the combination of means for supplying fluid with a constant head; a counter-head receptacle; a scale for indicating the level of the counter-head in the counter-head receptacle; connections between the means and counter-head receptacle comprising a removable fitting having a metering restriction, said fitting being arranged at the bottom of the receptacle; a rod extending through the receptacle and secured to the fitting, said rod having a scale thereon for indicating the counter-head and rate of discharge; and means for adjusting the rod to adjust the scale to the fluid level.

5. In a measuring device, the combination of means for supplying fluid with a constant head; a counter-head receptacle; a connection between the means and counter-head receptacle comprising a screw-threaded fitting having a metering restriction; and a rod secured to the fitting and extending through the receptacle and having a scale thereon for indicating the level in the receptacle, the screw of the fitting forming means for adjusting the level of the rod and for permitting of its removal.

6. In a measuring device, the combination of a float chamber; a counter-head receptacle adjacent to the float chamber; a connection between the float chamber and the counter-head receptacle comprising a metering restriction; and an observation tube in the connection leading between the float chamber and receptacle and another between the restriction and the discharge.

7. In a measuring device, the combination of a float chamber; a counter-head receptacle; a connection between the float chamber and the counter-head receptacle comprising a metering restriction; a scale for the counter-head receptacle for indicating the counter-head and rate of discharge; a supply tank; an adjustable support between the supply tank and the counter-head receptacle; and a connection between the supply tank and the float chamber.

8. In a measuring device, the combination of a portable fluid supply tank; a connection leading from the tank; a measuring apparatus to which said connection leads for measuring the flow of fluid from the tank through the connection; a scale for indicating the flow; and a support for said apparatus mounted on the tank and positioning said scale at an elevation above said tank.

9. In a measuring device, the combination of a portable fluid supply tank; a connection leading from the tank; a measuring apparatus to which said connection leads for measuring the flow of fluid from the tank through the connection; a scale for indicating the flow; a support for said apparatus mounted on the tank and positioning said scale at an elevation above said tank; and means for adjusting the elevation of the scale.

In testimony whereof I have hereunto set my hand.

FREDERICK O. BALL.